United States Patent
Gras

(10) Patent No.: US 6,908,980 B2
(45) Date of Patent: Jun. 21, 2005

(54) POLYADDITION PRODUCTS CONTAINING HYDROXYL AND URETDIONE GROUPS, PROCESS FOR THEIR PREPARATION, THEIR USE FOR THE PRODUCTION OF HIGHLY REACTIVE POLYURETHANE POWDER COATINGS WHICH ARE FREE FROM ELIMINATION PRODUCTS, AND THE POLYURETHANE POWDER COATINGS PRODUCED ACCORDINGLY

(75) Inventor: Rainer Gras, Bochum (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/436,063

(22) Filed: May 13, 2003

(65) Prior Publication Data

US 2003/0204040 A1 Oct. 30, 2003

Related U.S. Application Data

(62) Division of application No. 09/993,524, filed on Nov. 27, 2001, now Pat. No. 6,613,861, which is a continuation of application No. 08/728,508, filed on Oct. 9, 1996, now abandoned, which is a continuation of application No. 08/363,831, filed on Dec. 23, 1994, now abandoned.

(30) Foreign Application Priority Data

Feb. 28, 1994 (DE) ..................................... P 44 06 444

(51) Int. Cl.$^7$ ............................................. C08G 18/80
(52) U.S. Cl. .................... 528/73; 525/440; 252/182.22
(58) Field of Search ............................ 528/73; 525/440; 252/182.22

(56) References Cited

U.S. PATENT DOCUMENTS

| | | | |
|---|---|---|---|
| 3,923,743 A | 12/1975 | Quiring | |
| 4,413,079 A | 11/1983 | Disteldorf | |
| 4,483,798 A | 11/1984 | Disteldorf | |
| 5,356,945 A | 10/1994 | Werner et al. | |

FOREIGN PATENT DOCUMENTS

| | | |
|---|---|---|
| DE | 2 312 391 | 9/1974 |
| FR | 2 268 840 | 11/1975 |

OTHER PUBLICATIONS

Encyclopedia of Polymer Science—Eng., vol. 13, 1988; John Wiley & Sons, p. 290.

*Primary Examiner*—Rachel Gorr
(74) *Attorney, Agent, or Firm*—Oblon, Spivak, McClelland, Maier & Neustadt, P.C.

(57) ABSTRACT

Polyaddition products containing hydroxyl and uretdione groups, a process for their preparation, their use for the production of highly reactive polyurethane (PUR) powder coatings which are free from elimination products and which crosslink to give light-stable and weather-stable coating films of high gloss, and the powder coatings produced accordingly are provided.

55 Claims, No Drawings

POLYADDITION PRODUCTS CONTAINING HYDROXYL AND URETDIONE GROUPS, PROCESS FOR THEIR PREPARATION, THEIR USE FOR THE PRODUCTION OF HIGHLY REACTIVE POLYURETHANE POWDER COATINGS WHICH ARE FREE FROM ELIMINATION PRODUCTS, AND THE POLYURETHANE POWDER COATINGS PRODUCED ACCORDINGLY

CROSS-REFERENCE TO RELATED APPLICATIONS

This application is a division of application Ser. No. 09/993,524, filed on Nov. 27, 2001, now U.S. Pat. No. 6,613,861, which is a continuation of application Ser. No. 08/728,508, filed on Oct. 9, 1996, abandoned, which is a continuation of application Ser. No. 08/363,831, filed on Dec. 23, 1994, abandoned.

BACKGROUND OF THE INVENTION

1. Field of the Invention

The present invention relates to polyaddition products containing hydroxyl and uretdione groups, a process for their preparation, their use for the production of highly reactive polyurethane (PUR) powder coatings which are free from elimination products and which crosslink to give light-stable and weather-stable coating films of high gloss, and the powder coatings produced thereby.

2. Discussion of the Background

DE-C 30 30 572 presents a process for the preparation of polyaddition products which contain uretdione groups, and the products prepared accordingly. These are reaction products of the isocyanurate-free uretdione (UD) of 3-isocyanatomethyl-3,5,5-trimethylcyclohexyl isocyanate (isophorone diisocyanate, IPDI)—which can be prepared according to DE-C 30 30 513 or DE-C 37 39 549—with diols and, if desired, monoalcohols or monoamines. The reaction can be carried out in bulk or else in the presence of appropriate solvents. However, so far, in practice, this class of crosslinking agent has been produced in economically significant, saleable quantities only in a suitable solvent under mild conditions, at about 60° C., so as to avoid thermal ring cleavage during the synthesis. Preparation in bulk (i.e. in the absence of solvent) has not previously gone beyond the laboratory scale, since the viscosity reaches unmanageable levels during the reaction as a function of the molecular mass of the crosslinking agent. While DE-C 3030572 indicates that increasing the reaction temperature can operate as a means of controlling the reaction viscosity this measure is somewhat limited since higher temperatures can lead to detrimental effects on the reaction products.

This limit is also evident from the examples of DE-C 30 30 572 which use a product having a molecular weight of not more than 3,000 or at a uretdione/diol molar ratio of 5:4 for a uretdione grade having a free NCO content of 17 and a total NCO content of 37.8% by weight. If the free NCO content of the isophorone diisocyanate uretdione increases for a constant total NCO content (i.e. there is a simultaneous decrease in the degree of oligomerization and thus also in the molecular mass of the uretdione employed), then there is a corresponding decrease in the molecular mass of the uretdione group-containing polyaddition products. For the reasons given above, there seems little point in the preparation of uretdione group-containing polyaddition products of high molecular mass for use as crosslinking agents in the production of PUR powder coatings. This is also reflected in DE-C 30 30 539 and DE-C 30 30 588.

In DE-C 30 30 539 the molecular weights claimed are between 550 and 4,300, preferably between 1,500 and 2,000, and the uretdione/diol molar ratios are between 2:1 and 6:5, preferably between 3:2 and 5:4.

In DE-C 30 30 588 the claimed molecular weights are very similar, namely from 500 to 4,000, preferably between 1,450 and 2,800 at a uretdione/dial molar ratio comparable with that of DE-C 30 30 539.

Decisive disadvantages of the PUR powder coatings in accordance with the teachings of DE-C 30 30 539 and DE-C 30 30 588, which are free from elimination products, include the limited possibilities for combination with polymers containing hydroxyl groups. In DE-C 30 30 539, high functionalities of from $\geq 3.4$ to $\leq 7$, preferably from 3.7 to 4.5, were necessary. In order to achieve the high crosslinking density required for high-quality PUR powder coatings, it was necessary to compensate for the chain-terminating components of the crosslinking agent. In DE-C 30 30 588, it was necessary to take account of the free NCO content of the crosslinking agents in so far as the functionality of the hydroxyl group-containing polymers is to be adapted to the free NCO content in order to avoid gelling during extrusion, and therefore to suppress losses in the quality of the coatings. It was necessary to limit the OH functionality to from $\geq 2.2$ to $\leq 3.5$, preferably from 2.5 to 3.4. Complex investigation was and still is necessary in order to tailor the resin and curing agent to one another.

In DE-C 30 30 572, polyaddition products which contain uretdione groups and terminal OH groups are described in one example and are claimed. The scope corresponds to the polyaddition product specified above. However, the OH-terminal polyaddition products have so far acquired no importance in the PUR powder coating sector, since there was no economic value seen in comparing with the other crosslinking agents (see Example 5 of DE-C 30 30 572 in comparison with the remaining examples). The numbers speak for themselves. These and chemical reasons, namely the uncontrolled polyaddition of the free OH groups with NCO groups, which are additionally produced by uretdione cleavage during synthesis, have been considered as sufficient to attach no importance to this kind of crosslinking agent.

SUMMARY OF THE PRESENT INVENTION

Accordingly, one object of the present invention is to provide polyaddition products which contain hydroxyl and uretdione groups, which are useful as crosslinking agents for the production of PUR powder coatings which are free from elimination products.

A further object of the present invention is to provide PUR powder coatings produced from polyaddition products containing both hydroxyl and uretdione groups.

A further object of the present invention is to provide a methods for the production of polyaddition products which contain both hydroxyl and uretdione groups, in which the methods can be either solvent free or solution based methods.

These and other objects of the present invention have been satisfied by the discovery or polyaddition products containing hydroxyl and uretdione groups and having high molecular masses which are obtained by reacting I. from 40 to 85% by weight of the uretdione of isophorone diisocyanate and
II. from 60 to 15% by weight of diols and/or chain extenders, wherein the polyaddition products have terminal hydroxyl groups, have a functionality of 2 and a molecular mass of between 4,500 and 10,000, preferably between 5,500 and 7,000, which can be formulated, in combination with hydroxyl group-containing polymers, to give PUR powder coatings which, possess heightened reactivity and lead to a gloss which is outstanding for PUR powder coatings.

DETAILED DESCRIPTION OF THE PREFERRED EMBODIMENTS

The present invention accordingly relates to polyaddition products which contain hydroxyl and uretdione groups and are produced from the uretdione of isophorone diisocyanate and diols and/or chain extenders.

The invention also relates to the use of the polyaddition products in transparent or pigmented PUR powder coatings of high reactivity and excellent gloss which are free from elimination products and which are produced from the bifunctional polyaddition products, free of blocking agents and containing hydroxyl and uretdione groups, and from hydroxyl group-containing polymers and the additives customary in PUR chemistry.

The isocyanurate-free uretdione of isophorone diisocyanate is highly viscous at room temperature with a viscosity of greater than $10^6$ mpa·s; at 60° C. the viscosity is $13 \cdot 10^3$ mpa·s and at 80° C. it is $1.4 \cdot 10^3$ mPa·s. The free NCO content is between 16.8 and 18.5% by weight, indicating that high proportions of the polyuretdione of IPDI must be present in the reaction product. The monomer content is ≈1%. The total NCO content of the reaction product after heating at 180–200° C. is 37.5–37.8% by weight.

Diols which are suitable for the preparation of the polyaddition products according to the present invention, include those diols conventionally used in PUR chemistry, with particular preference given to ethylene glycol (E), butane-1,4-diol (B), pentane-1,5-diol (P), hexane-1,6-diol (HD), 3-methylpentane-1,5-diol (Pm), 2,2,4(or 2,4,4)-trimethylhexanediol (TMH-d) and neopentylglycol hydroxypivalate (Eg).

The polyaddition products of the present invention advantageously contain chain extenders in the form of linear polyesters which contain hydroxyl groups and have a: molecular mass between 250 and 2,000, preferably from 300 to 1,500. They are prepared by, for example, combination of diols and dicarboxylic acids.

To prepare the chain extenders—linear polyesters containing hydroxyl groups—it is preferred to employ not only the above-mentioned diols but also 2-methylpropanediol, 2,2-dimethylpropanediol (NPG), diethylene glycol, dodecane-1,12-diol ($C_{12}$) and trans- and ciscyclohexanedimethanol (CHDM).

The preferred dicarboxylic acids include aliphatic and optionally alkyl-branched acids, such as succinic, adipic (As), suberic, azelaic and sebacic (Sb) acid, and 2,2,4(or 2,4,4)-trimethyladipic acid. Also included are lactones and hydroxycarboxylic acids, such as ε-caprolactone and hydroxycaproic acid.

The diol/chain extender mixtures used in the present invention have a diol/chain extender ratio of from 5:95 to 90:10. The products of the invention can be prepared either in solvent or in bulk (i.e. without solvent).

The polyaddition products according to the invention can be obtained, inter alia, by a process such as the one described below.

The reaction in solvent is carried out at temperatures of from 50 to 100° C., preferably between 60 and 90° C. The OH component, diols and/or chain extenders, are added as initial charge and the uretdione is added as rapidly as possible while preventing the reaction temperature from exceeding the limit specified above. The reaction is complete after from 30 to 150 minutes. Subsequently the solvent is removed. Apparatus suitable for this purpose include evaporation screws, filmtruders or, alternatively, spray-dryers.

Suitable solvents for the reaction include benzene, toluene or other aromatic or aliphatic hydrocarbons, acetates such as ethyl or butyl acetate, ketones such as acetone, methyl ethyl ketone and methyl isobutyl ketone, or chlorinated aromatic and aliphatic hydrocarbons, as well as any desired mixtures of these or other solvents which are inert to the reaction conditions and non-reactive with the reaction components.

The solvent-free and continuous preparation of the products involves intensive kneading in a single- or multi-screw extruder, in particular in a twin-screw extruder. The solvent-free synthesis requires temperatures of significantly >120° C. to 190° C. It came as a surprise that temperatures this high could be used for the uretdione syntheses. These temperatures are well within the range in which uretdiones unblock, meaning that high contents of free isocyanate can occur and produce uncontrolled and undesired side reactions. This problem was considered particularaly significant for the synthesis of uretdione polyaddition products containing hydroxyl groups, and thus it was all the more surprising that this synthesis could be carried out. Factors which proved advantageous in the solvent free synthesis were the short reaction times of <5 minutes, preferably <3 minutes, more preferably <2 minutes. A further principle is that the short exposure to heat is sufficient to give a homogenous mixture of the reactants and to cause them to react completely or very substantially. Subsequently, controlled cooling is carried out in accordance with the development of equilibrium, and, if necessary, the reaction is taken to completion.

The reaction products are supplied to the kneading apparatus in separate product streams; it is possible to preheat the starting components at up to 100° C., preferably up to 80° C. If there are more than two product streams, then these can also be metered in batches. Diol, chain extender, catalysts, or other conventional coatings additives, such as levelling agents and/or stabilizers, or mixtures thereof can be combined into one product stream. The same applies to those which are inert towards isocyanate groups: catalysts and, correspondingly, the above-mentioned coatings additives.

Similarly, the sequence of the product streams can be varied, and the point of entry for the product streams may be at different locations along the length of the intensive kneading apparatus.

Known processes and technologies are used for the secondary reaction, cooling, comminution and bag-filling.

In order to accelerate the reaction of polyaddition, it is also possible to use conventional PUR catalysts. These are employed in a concentration of from 0.01 to 1% by weight, preferably from 0.03 to 0.5% by weight, based on the reaction components employed. Catalysts which have proven particularly suitable are tin(II) and tin(IV) compounds. Most preferred as catalyst is dibutyltin dilaurate (DBTL). However, other catalysts would not be regarded as unsuitable per se.

The present invention relates, furthermore, to the use of the polyuretdione addition products according to the invention, containing hydroxyl and uretdione groups, in PUR powder coatings, which are surprisingly distinguished by heightened reactivity. Entirely surprisingly, therefore, the curing conditions can be reduced distinctly in comparison with those previously known, which is significant both on economic and on ecological grounds.

The present invention further relates to polyurethane powder coatings which are free from elimination products and which comprise the polyaddition products according to the invention in combination with hydroxyl group-containing polymers.

Suitable co-reactants for PUR powder coatings are compounds which contain one or more functional groups which react with isocyanate groups during the curing process as a function of temperature and time, such as hydroxyl, carboxyl, mercapto, amino, urethane and (thio)urea groups. Polymers which can be employed include both condensation polymers and addition polymers.

Preferred polymeric components include polyethers, polythioethers, polyacetals, polyesteramides, epoxy resins containing hydroxyl groups in the molecule, amino resins and their modification products with polyfunctional alcohols, polyazomethines, polyurethanes, polysulphonamides, melamine derivatives, cellulose esters and ethers, partially hydrolysed homo- and copolymers of vinyl esters, polyesters and acrylate resins, with polyester and acrylate resins being most preferred.

Carboxylic acids which are preferred for the preparation of the polyesters include aliphatic, cycloaliphatic, aromatic or heterocyclic acids or combinations thereof and may, if desired, be substituted by one or more halogen atoms or unsaturated or both and their esters or anhydrides. Suitable carboxylic acids include succinic, adipic (AS), suberic, azelaic, Bebacic, phthalic, terephthalic (Ts), isophthalic (Is), trimellitic, pyromellitic, tetrahydrophthalic, hexahydrophthalic, hexahydroterephthalic, di- and tetrachlorophthalic, endomethylenetetrahydrophthalic, glutaric, maleic and fumaric acids and—where accessible— their anhydrides, dimethyl terephthalate (DMT), bisglycol terephthalate and also cyclic monocarboxylic acids such as benzoic acid, p-tert-butylbenzoic acid or hexahydrobenzoic acid.

Examples of suitable polyhydric alcohols include ethylene glycol, 1,2-propylene glycol and 1,3-propylene glycol, 1,4-butylene glycol and 2,3-butylene glycol, di-β-hydroxyethylbutanediol, hexane-1,6-diol, octane-1,8-diol, neopentylglycol, cyclohexanediol, 1,4-bis(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 3-methylpentane-1,5-diol, 2,2,4(or 2,4,4)-trimethylhexane-1,6-diol, glycerol, trimethylolpropane, trimethylolethane, hexane-1,2,6-triol, butane-1,2,4-triol, tris(β-hydroxyethyl)isocyanurate, pentaerythritol, mannitol, sorbitol, diethylene glycol, triethylene glycol, tetraethylene glycol, dipropylene xylylene glycol and neopentylglycol hydroxypivalate.

Mono- and polyesters of lactones, such as ε-caprolactone, or hydroxycarboxylic acids, such as hydroxypivalic acid, w-hydroxydecanoic acid, and ω-hydroxycaproic acid can also be employed. Also suitable are polyesters of the above-mentioned polycarboxylic acids or their esters or anhydrides with polyphenols, such as hydroquinone, bisphenol A, 4,4'-dihydroxybiphenyl or bis (4-hydroxyphenyl) sulphone; polyesters of carbonic acid obtainable from hydroquinone, diphenylolpropane, p-xylylene glycol, ethylene glycol, butanediol or hexane-1,6-diol and other polyols by conventional condensation reactions with carbonate producing reagents such as phosgene or diethyl or diphenyl carbonate, or from cyclic carbonates such as glycol carbonate or vinylidene carbonate, by conventional polymerization procedures. Further compounds which can be employed are polyesters of silicic acid, polyesters of phosphoric acid, such as those from methane-, ethane-, β-chloroethane-, benzene- or styrenephosphoric acid, or the corresponding phosphoryl chlorides or phosphoric esters, and polyalcohols, or polyphenols of the type mentioned above; polyesters of boric acid; polysiloxanes, such as the products obtained by hydrolysis of dialkyldichlorosilanes with water followed by treatment with polyalcohols, and the products obtained by addition reaction of polysiloxane dihydrides with functionalized olefins, such as allyl alcohol or acrylic acid.

Other preferred polyesters include the reaction products of polycarboxylic acids with glycidyl compounds, as described, for example, in DE-A 24 10 513.

The hydroxyl group-containing polyesters which are preferred have an OH functionality of >2, an OH number of from 20 to 200 mg of KOH/g, preferably from 30 to 150 mg of KOH/g, a viscosity of <60,000 mpa·s, preferably <40,000 mPa·s at 140° C. and a melting point of ≧70° C. to ≦120° C., preferably from 75° C. to 100° C.

Examples of glycidyl compounds which can be used are esters of 2,3-epoxy-1-propanol with monobasic acids having from 4 to 18 carbon atoms (such as glycidyl palpitate, glycidyl laurate and glycidyl stearate) or alkylene oxides having from 4 to 18 carbon atoms, such as glycidyl ether.

The dicarboxylic acids which can be used in this process include all those polycarboxylic acids listed below under II; it is also possible to employ monocarboxylic acids, which are listed under III by way of example.

Other preferred components are monomeric esters, such as bis-hydroxy(alcohol) esters of dicarboxylic acids, esters of monocarboxylic acids with polyols having a functionality of more than two, and oligoesters which can be prepared by condensation reactions from the raw materials which are customary in paint chemistry. Examples of such customary materials include:

I. alcohols having 2 to 24, preferably 2 to 10, carbon atoms and 2 to 6 OH groups which are attached to nonaromatic carbon atoms, such as ethylene glycol, propylene glycol, diethylene glycol, dipropylene glycol, butanediols, neopentyl glycol, hexanediols, hexanetriols, perhydrobisphenol, dimethylolcyclohexane, glycerol, trimethylolethane, trimethylolpropane, pentaerythritol, dipentaerythritol and mannitol;

II. di- and polycarboxylic acids having 4 to 36 carbon atoms and 2 to 4 carboxyl groups and esterifiable derivatives thereof, such as anhydrides and esters, including phthalic acid (anhydride), isophthalic acid, terephthalic acid, alkyltetrahydrophthalic acid, endomethylenetetrahydrophthalic anhydride, adipic acid, succinic acid, maleic acid, fumaric acid, dimeric fatty acids, trimellitic acid, pyromellitic acid and azelaic acid;

III. monocarboxylic acids having 6 to 24 carbon atoms, such as caprylic acid, 2-ethylhexanoic acid, benzoic acid, p-tert-butylbenzoic acid, hexahydro-benzoic acid, mixtures of monocarboxylic acids from natural oils and fats, such as coconut fatty acid, soya-oil fatty acid, castor oil fatty acid, hydrogenated and isomerized fatty acids, such as "Konjuvandol fatty acid and mixtures thereof; it is also possible to use fatty acid glycerides and to react them by transesterification and/or dehydration;

IV. monohydric alcohols having 1 to 18 carbon atoms, such as methanol, ethanol, isopropanol, cyclohexanol, benzyl alcohol, isodecanol, nonanol, octanol and oleyl alcohol.

The polyesters can be obtained in a conventional manner by condensation in an inert gas atmosphere at temperatures of from 100 to 260° C., preferably from 130 to 220° C., in the melt or in an azeotropic procedure, as described in, for example, Methoden der Organischen Chemie [Methods of Organic Chemistry] (Houben-Weyl), volume 14/2, 1–5, 21, 23, 40, 44, Georg Thieme Verlag, Stuttgart, 1963 or in C. R. Martens, Alkyd Resins, 51–59, Reinhold Plastics Appl. Series, Reinhold Publishing Comp., New York, 1961.

Preferred acrylate resins for possible use as OH components are homo- or copolymers of monomers such as the following: esters of acrylic acid and methacrylic acid with dihydric, saturated, aliphatic alcohols having 2 to 4 carbon atoms, such as 2-hydroxyethyl acrylate, 2hydroxypropyl acrylate, 4-hydroxybutyl acrylate and the corresponding methacrylates; allyl acrylates and methacrylates having 1 to 18 carbon atoms in the alcohol component, such as methyl acrylate, ethyl acrylate, propyl acrylate, isopropyl acrylate, n-butyl acrylate, tert-butyl acrylate, 2-ethylhexyl acrylate, stearyl acrylate and the corresponding methacrylates; cyclohexyl acrylate and methacrylate; acrylonitrile and methacrylo-nitrile, acrylamide and methacrylamide; and N-methoxy-methyl(meth)acrylamide.

Particularly preferred acrylate resins are copolymers of
a. from 0 to 50% by weight of esters of acrylic or methacrylic acid with dihydric or polyhydric alcohols, such as 1,4-butanediol monoacrylate, hydroxypropyl (meth) acrylate; and also vinylglycol, vinylthioethanol, allyl alcohol and 1,4-butanediol monovinyl ether;
b. from 5 to 95% by weight of esters of acrylic acid or methacrylic acid with monohydric alcohols containing from 1 to 12 carbon atoms, such as methyl methacrylate, ethyl acrylate, n-butyl acrylate or 2ethylhexyl acrylate;
c. from 0 to 50% by weight of aromatic vinyl compounds, such as styrene, methylstyrene or vinyltoluene;
d. from 0 to 20% by weight of other monomers having functional groups, includes acrylic acid, methacrylic acid, crotonic acid, itaconic acid, maleic acid, fumaric acid, maleic anhydride, maleic monoesters, acrylamide, methacrylamide, acrylonitrile or N-methylol(meth) acrylamide and glycidyl(meth)acrylate, provided that the total of components a) and b) must be at least 5% by weight.

The acrylate resins can be prepared by conventional polymerization including bulk, solution, suspension, emulsion or precipitation polymerization, but preferably by bulk polymerization which, in turn, can be initiated by UV light.

Further polymerization initiators which are used are the conventional peroxides or azo compounds, such as dibenzoyl peroxide, tert-butyl perbenzoate or azobisisobutyronitrile. The molecular weight can be regulated using, conventional molecular weight regulator, including the sulphur compounds such as tertdodecanethiol.

Preferred polyethers can be prepared by the polyaddition of an epoxide, such as ethylene oxide, propylene oxide, butylene oxide, trimethylene oxide, 3,3-bis(chloromethyl) oxacyclobutane, tetrahydrofuran, styrene oxide, the bis(2,5-epoxypropyl)ether of diphenylolpropane or epichlorohydrin with itself, for example in the presence of $BF_3$, or by the addition of the epoxide, if desired alone or as a mixture or in succession, with starting components containing reactive hydrogen atoms, such as alcohols or amines, including water, ethylene glycol, 1,3-propylene glycol or 1,2-propylene glycol, pentamethylene glycol, hexanediol, decamethylene glycol, trimethylolpropane, 4,41-dihydroxydiphenylpropane, aniline, ammonia, ethanolanine, ethylenediamine, di(β-hydroxypropyl)methylamine, di(β-hydroxyethyl)aniline, hydrazine, and also hydroxyalkylated phenols, such as di(β-hydroxyethoxy)resorcinol.

It is also possible to employ polyureas and/or polyurethanes containing hydroxyl groups in the process of the present invention.

As polyhydroxy compounds it is also possible, of course, to employ mixtures of two or more polyhydroxy compounds as described above.

The ratio in which the hydroxyl group-containing polymers and the isocyanate component are mixed is selected such that 0.5–1.2, preferably 0.8–1.1, most preferably 1.0, free and/or blocked NCO groups are present per OH group.

For the production of PUR powder coatings, the isocyanate component is mixed and homogenized in the melt with the appropriate hydroxyl group-containing polymer and, if desired, catalysts, pigments, fillers, levelling agents, such as silicone oil, and acrylate resins. This can be carried out in any suitable apparatus, such as a heatable kneading apparatus, but preferably by extrusion, in which case upper temperature limits of from 130 to 140° C. should not be exceeded. After the extruded composition has been cooled to room temperature and comminuted appropriately, it is ground to give the ready-to-spray powder. The application of the ready-to-spray powder to suitable substrates can be carried out by conventional processes, including, but not limited to, electrostatic powder spraying, fluidized-bed sintering, or electrostatic fluidized-bed sintering. After the application of the powder, the coated work-pieces are heated for curing purposes for from 60 to 4 minutes at a temperature of from 150 to 220° C., preferably for 30 to 6 minutes at from 160 to 200° C.

Having generally described this invention, a further understanding can be obtained by reference to certain specific examples which are provided herein for purposes of illustration only and are not intended to be limiting unless otherwise specified.

EXAMPLES

A. Preparation of the Polyaddition Products According to the Present Invention, Containing Hydroxyl and Uretdione Groups A1: Polyol Chain Extenders General Preparation Procedure The starting components—see Table 1—were placed in a reactor and heated to ≈140° C. using an oil bath. After the substances had very largely melted, 0.1% by weight of di n-butyltin oxide was added as catalyst. Elimination of water began at 150 to 160° C. Over the course of 2 to 3 hours the temperature was raised to 180° C. to 190° C. and the esterification was brought to an end over a further 8 to 10 hours. Throughout the reaction period the bottom product was stirred and a gentle stream of nitrogen was passed through the reaction mixture. The acid number of the polyesters was in each case <2 mg of KOH/g.

TABLE 1

| | Polyol chain extenders | | | | | | |
|---|---|---|---|---|---|---|---|
| | | | | | | Characteristics | |
| | Starting components in mole | | | | | OH number | Viscosity 25° C. |
| Example A 1 | As | Sb | NPG | P | HD | mg KOH/g | mPa · s |
| 1 | 1 | | 2 | | | 335 ± 15 | ≈1,500 |
| 2 | 1.25 | | 2.25 | | | 290 ± 10 | ≈1,950 |
| 3 | 1 | | | | 2 | 335 ± 15 | ≈1,270 |
| 4 | | 1 | 2 | | | 289 ± 10 | ≈1,150 |

TABLE 1-continued

Polyol chain extenders

| Example | Starting components in mole | | | | | Characteristics | |
|---|---|---|---|---|---|---|---|
| | | | | | | OH number | Viscosity 25° C. |
| A 1 | As | Sb | NPG | P | HD | mg KOH/g | mPa · s |
| 5 | 4 | | 3 | | 2 | 106 ± 7 | ≈3,500 |
| 6 | Polycaprolactones from Interox-Capa 200 | | | | | 216 | Melting range 18–23° C. |
| 7 | Polycaprolactones from Interox-Capa 210 | | | | | 112 | Melting range 30–40° C. |

A2: Polyaddition Products Containing Hydroxyl and Uretdione Groups

General Preparation Procedures

A 2.1 from solvent

The polyol component—see Table 2—and the catalyst (0.03–0.5% by weight of DBTL), in solution in a solvent, were placed in the reactor. With vigorous stirring and under an inert gas atmosphere, the calculated quantity of IPDI uretdione, in solution in the solvent, was added at a rate such that the reaction temperature did not exceed 100° C. The reaction was monitored by means of titrimetric determination of NCO and was complete after 1 to 3 hours. The solvent was then removed, and the product was cooled and comminuted if appropriate.

A 2.2 without solvent

The IPDI uretdione at a temperature of 60 to 110° C. was fed into the intake housing of a twinscrew extruder, the polyol component—see Table 2—being metered in simultaneously at a temperature of 25 to 110° C. If desired, the uretdione and/or the polyol component contained the quantity of catalyst required—from 0.03 to 0.5% by weight of DBTL—based on the end product.

The extruder employed was composed of ten housings of which five were heating zones. The temperatures of the heating zones were subject to a wide range—between 50 and 180° C.—and could be controlled individually. All of the temperatures were setpoint temperatures, with regulation in the housings being carried out by electrical heating and pneumatic cooling. The die element was heated by means of an oil thermostat. The speed of the two screws, fitted with conveying elements, was between 50 and 380 rpm.

The reaction product, obtained in quantities of from 10 to 130 kg/h, was either cooled and then comminuted or shaped and bagged, or the actual melt was shaped, and the shaped articles were then cooled and bagged.

The physical and chemical characteristics of the process products of the invention and the molar compositions are summarized in Table 2.

TABLE 2

| | Composition (mole) | | | Chemical and physical characteristics | | | |
|---|---|---|---|---|---|---|---|
| Example | IPDI | | Chain extender | NCO content (% by weight) | | Melting range | Glass transition |
| A 2 | uretdione | Diol(s) | A 1 | free | total | ° C. | temperature |
| 1 | (7) | Eg (8) | — | 0 | 12.1 | 108–115 | 62–81 |
| 2 | (7) | Eg (3), C$_{12}$ (3), E (2) | — | <0.1 | 12.8 | 110–113 | 65–87 |
| 3 | (7) | Eg (4), B (4) | — | <0.1 | 13.1 | 117–122 | 82–95 |
| 4 | (7) | Eg (4), TMH-d (4) | — | <0.1 | 12.5 | 101–103 | 56–72 |
| 5 | (7) | Eg (6), Pm (2) | — | 0 | 12.4 | 108–111 | 61–78 |
| 6 | (8) | Eg (4), Pm (3), B (2) | — | 0.1 | 13.1 | 106–114 | 58–75 |
| 7 | (8) | TMH-d (6), B (3) | — | 0.1 | 13.6 | 111–115 | 63–81 |
| 8 | (9) | TMH-d (5), Pm (4), B (1) | — | <0.1 | 13.8 | 113–118 | 66–84 |
| 9 | (9) | Eg (4), TMH-d (3) B (2), E (1) | — | 0.1 | 13.5 | 115–119 | 68–87 |
| 10 | (7) | B (4), E (2) | 6 (2) | <0.1 | 12.7 | 90–94 | 52–77 |
| 11 | (7) | Eg (3.5), E (2.5) TMH-d (1.25) | 6 (0.75) | <0.1 | 12.8 | 110–113 | 65–87 |
| 12 | (7) | Pm (6.5) | 6 (1.5) | 0 | 11.0 | 83–89 | 44–60 |
| 13 | (7) | Eg (3.5), E (1) TMH-d (2.5) | 7 (1) | <0.1 | 10.1 | 81–86 | 41–57 |
| 14 | (7) | Eg (3.5), HD (2) E (1.5) | 6 (0.5) 7 (0.5) | 0 | 11.5 | 91–94 | 45–60 |
| 15 | (7) | Eg (3.5), E (3.5) | 5 (0.5) 6 (0.5) | 0 | 11.7 | 99–102 | 56–79 |
| 16 | (6.5) | Eg (3), P (2) E (1.5) | 5 (0.5) 6 (0.5) | 0 | 11.9 | 101–108 | 65–86 |
| 17 | (8) | Eg (4), TMH-d (1.25) Pm (2), E (1) | 5 (0.5) 6 (0.25) | 0.1 | 12.2 | 112–118 | 77–91 |

TABLE 3

| Example | Composition (mole) | | | Chemical and physical characteristics | | | |
|---------|---|---|---|---|---|---|---|
| | IPDI | | Chain extender | NCO content (% by weight) | | Melting range | Glass transition |
| A 2 | uretdione | Diol(s) | A 1 | free | total | °C. | temperature |
| 1 | (6) | B (1) | 1 (6) | <0.1 | 9.9 | 85–92 | 61–66 |
| 2 | (7) | E (2) | 1 (6) | <0.1 | 10.8 | 88–91 | 53–67 |
| 3 | (7) | E (4) | 1 (4) | 0 | 12.4 | 104–107 | 69–87 |
| 4 | (7) | B (4.75) | 1 (3.25) | 0 | 12.2 | 102–104 | 70–85 |
| 5 | (7) | TMH-d (7) | 1 (1) | <0.1 | 12.2 | 106–109 | 72–82 |
| 6 | (7.5) | P (6.75) | 1 (1.75) | 0 | 13.1 | 104–111 | 72–91 |
| 7 | (8) | Pm (7.75) | 1 (1.25) | 0 | 13.4 | 111–117 | 81–96 |
| 8 | (7) | Pm (6.5) | 2 (1.5) | <0.1 | 12.3 | 112–115 | 75–90 |
| 9 | (7.5) | E (6) | 2 (2.5) | 0 | 12.7 | 110–118 | 77–95 |
| 10 | (7.5) | TMH-d (3) E (3) | 2 (2.5) | <0.1 | 12.3 | 108–115 | 71–86 |
| 11 | (7) | TMD-d (6.5) | 3 (1.5) | <0.1 | 11.9 | 99–103 | 71–84 |
| 12 | (8) | HD (6.5) | 3 (2) | <0.1 | 12.6 | 105–114 | 74–87 |
| 13 | (7) | TMH-d (7) | 4 (1) | 0 | 12.2 | 99–102 | 74–90 |
| 14 | (7.5) | B (5.5) | 4 (3) | 0 | 12.3 | 112–117 | 79–89 |
| 15 | (8) | Pm (7) | 4 (2) | <0.1 | 12.6 | 109–117 | 75–92 |
| 16 | (7) | Eg (3.25) Pm (3.25) | 5 (1.5) | 0 | 9.8 | 73–77 | 41–55 |
| 17 | (7) | TMH-d (3.75) Eg (3.5) | 5 (0.75) | 0 | 10.2 | 90–93 | 53–76 |
| 18 | (7) | Eg (5) E (2.5) | 5 (0.5) | <0.1 | 11.9 | 107–110 | 67–88 |

The IPDI uretdione produced by the known process had the following NCO characteristics:
free: from 16.8 to 18.5% by weight
total: from 37.5 to 37.8% by weight B. Polyester Table 4 below gives an overview of the polyesters on the market which are employed for the formulation of PUR powder coatings.

TABLE 4

| | | | Chemical and physical characteristics | | | | |
|---|---|---|---|---|---|---|---|
| Example B | Manufacturer country | Name of product | OH number mg KOH/g | Acid number mg KOH/g | Melting range °C. | Glass transition temperature °C. | Viscosity at 160° C. mPa · s |
| 1 | Hoechst AG Italy | Alftalat AN 739 | 55–60 | 2–4 | 82–90 | >50 | 24–29,000 |
| 2 | DSM Netherlands | Uralac P 1460 | 38–41 | 4–4.5 | 70–75 | 50 | 40,000 |
| 3 | UCB Belgium | Crylcoat 240 | 26–31 | 3–4 | 74–80 | >50 | 33–38,000 |

C. Polyurethane Powder Coatings

General Preparation Procedure

The comminuted products, crosslinking agents, polyesters, levelling agent masterbatch and, if desired, catalyst masterbatch were intimately mixed, together with the white pigment (if desired), in an edge runner mill and then homogenized in an extruder at not more than 130° C. The extrudate was then cooled, fractionated and ground in a pin mill to a particle size <100 μm. The powder thus prepared was applied using an electrostatic powder spraying unit at 60 kV to degreased and—if appropriate—pretreated iron panels which were baked in a circulating-air drying cabinet at temperatures of between 160 and 200° C.

Levelling Agent Masterbatch 10 percent by weight of the levelling agent—a commercially available copolymer of butyl acrylate and 2-ethylhexyl acrylate—were homogenized in the melt in the corresponding polyester and, after solidifying, were comminuted.

Catalyst Masterbatch 5 percent by weight of the catalyst—DBTL—were homogenized in the melt in the corresponding polyester and, after solidifying, were comminuted.

The abbreviations in the following tables denote:

| LT | = layer thickness in μm | |
| KH | = Koenig hardness (sec) | (DIN 53 157) |
| BH | = Buchholz hardness | (DIN 53 153) |
| EI | = Erichsen indentation | (DIN 53 156) |
| CH | = crosshatch test | (DIN 53 151) |
| GG 60° < | = gloss measurement according to Gardner | (ASTM-D 523) |
| Imp. rev. | = impact reverse in g · m | |

TABLE 5

Pigmented powder coatings

Example C

| | 1 | 2 | 3 | 4 | 5 | 6 | 7 | 8 | 9 | 10 | 11 | 12 |
|---|---|---|---|---|---|---|---|---|---|---|---|---|
| Formulation | | | | | | | | | | | | |
| Crosslinking agent acc. to A 2 | 25.98 | 20.84 | 14.5 | 26.44 | 21.36 | 24.83 | 13.76 | 24.97 | 26.13 | 20.97 | 14.6 | 27.07 |
| Table 2 (Example) | (2) | (2) | (2) | (4) | (5) | (7) | (7) | (9) | (10) | (10) | (10) | (11) |
| Polyester acc. to B 1 | 74.02 | — | — | 73.56 | — | 75.17 | — | 75.03 | 73.87 | — | — | 72.93 |
| Polyester acc. to B 2 | — | 79.16 | — | — | 78.64 | — | — | — | — | 79.03 | — | — |
| Polyester acc. to B 3 | — | — | 85.5 | — | — | — | 86.24 | — | — | — | 85.4 | — |
| Notes: | All formulations contain 40% by weight of $TiO_2$ (white pigment) and each contain 0.5% by weight of levelling agent and benzoin and 0.15% by weight of DBTL; the OH/NCO ratio = 1:1 | | | | | | | | | | | |
| Coatings data | | | | | | | | | | | | |
| LT | 55–70 | 70–95 | 55–80 | 60–75 | 65–80 | 55–70 | 60–85 | 55–70 | 65–85 | 60–70 | 65–85 | 70–95 |
| KH | 192 | 200 | 193 | 194 | 191 | 197 | 195 | 192 | 188 | 184 | 186 | 186 |
| BH | 100 | 111 | 100 | 111 | 100 | 100 | 111 | 100 | 100 | 100 | 111 | 111 |
| CH | 0 | 0 | 0 | 0 | 0 | 0 | 0 | 0 | 0 | 0 | 0 | 0 |
| GG 60° ≤ | 88–89 | 89–92 | 92–93 | 89–91 | 90–91 | 88–90 | 90–93 | 88–89 | 90 | 90–91 | 92–93 | 89–92 |
| EI | >10 | >10 | >10 | >10 | 9.5–9.8 | 9.7–10 | >10 | 9.2–10 | >10 | >10 | >10 | 10 |
| Impr. rev. | >944.6 | >944.6 | >944.6 | >944.6 | 806.4 | 806.4 | >944.6 | >944.6 | >944.6 | >944.6 | >944.6 | >944.6 |
| Notes: | Curing conditions: 200° C./8 minutes or 180° C./15 minutes | | | | | | | | | | | |

TABLE 6

Pigmented powder coatings

Example C

| | 13 | 14* | 15 | 16* | 17 | 18 | 19 | 20 | 21 | 22 | 23 | 24 |
|---|---|---|---|---|---|---|---|---|---|---|---|---|
| Formulation | | | | | | | | | | | | |
| Crosslinking agent acc. to A 2 | 29 | 24.62 | 16.48 | 13.64 | 28.09 | 27.74 | 22.36 | 15.65 | 27.4 | — | — | — |
| Table 2 (Example) | (12) | (12) | (12) | (12) | (14) | (15) | (15) | (15) | (17) | | | |
| Crosslinking agent acc. to A 2 | — | — | — | — | — | — | — | — | — | 31.21 | 29.38 | 16.74 |
| Table 3 (Example | | | | | | | | | | (1) | (2) | (2) |
| Polyester acc. to B 1 | 71 | 75.38 | — | — | 71.91 | 72.26 | — | — | 72.6 | 68.79 | 70.62 | — |
| Polyester acc. to B 2 | — | — | — | — | — | — | 77.64 | — | — | — | — | — |
| Polyester acc. to B 3 | — | — | 83.52 | 86.36 | — | — | — | 84.35 | — | — | — | 83.26 |
| Notes: | All formulations contain 40% by weight of $TiO_2$ (white pigment) and each contain 0.5% by weight of levelling agent and benzoin and 0.15% by weight of DBTL; the OH/NCO ratio = 1:1, *OH/NCO = 1:0.8 | | | | | | | | | | | |
| Coatings data | | | | | | | | | | | | |
| LT | 70–75 | 80–95 | 70–90 | 65–85 | 70–85 | 50–65 | 65–80 | 60–75 | 70–85 | 60–75 | 65–80 | 70–75 |
| KH | 188 | 186 | 185 | 183 | 183 | 182 | 80 | 185 | 181 | 182 | 180 | 187 |
| BH | 118 | 100 | 100 | 111 | 111 | 100 | 184 | 100 | 100 | 100 | 105 | 100 |
| CH | 0 | 0 | 0 | 0 | 0 | 0 | 0 | 0 | 0 | 0 | 0 | 0 |
| GG 60° ≤ | 89 | 90–91 | 92–93 | 93 | 89–90 | 88 | 89 | 92 | 89 | 89 | 88 | 91–92 |
| EI | >10 | >10 | >10 | >10 | >10 | >10 | >10 | 9.3 | 9.9 | >10 | >10 | >10 |
| Impr. rev. | >944.6 | >944.6 | >806.4 | >944.6 | 691.2 | 576 | 806.4 | 576 | 691.2 | 944.6 | >944.6 | >944.6 |
| Notes: | Curing conditions: 200° C./8 minutes or 180° C./15 minutes | | | | | | | | | | | |

TABLE 7

Pigmented powder coatings

| | Example C | | | | | | | | | | | |
|---|---|---|---|---|---|---|---|---|---|---|---|---|
| | 25 | 26 | 27 | 28 | 29 | 30 | 31 | 32 | 33 | 34 | 35 | 36 |
| Formulation | | | | | | | | | | | | |
| Crosslinking agent acc. to A 2 | 26.59 | 14.9 | 25.58 | 25.53 | 25.53 | 21.53 | 20.46 | 14.22 | 21.5 | 26.01 | 17.55 | 22.06 |
| Table 3 (Example) | (3) | (3) | (4) | (6) | (6) | (6) | (6) | (6) | (8) | (13) | (17) | (18) |
| Polyester acc. to B 1 | 73.41 | — | — | 74.47 | 74.47 | 78.47 | — | — | — | 73.99 | — | — |
| Polyester acc. to B 2 | — | — | 74.42 | — | — | — | 79.54 | — | 78.5 | — | — | 77.94 |
| Polyester acc. to B3 | — | 85.1 | — | — | — | — | — | 85.78 | — | — | 82.45 | — |
| Notes: | All formulations contain 40% by weight of TiO$_2$ (white pigment) and each contain 0.5% by weight of levelling agent and benzoin and 0.15% by weight of DBTL; the OH/NCO ratio = 1:1, *OH/NCO = 1:0.8 | | | | | | | | | | | |
| Coatings data | | | | | | | | | | | | |
| LT | 75–90 | 75–85 | 65–80 | 60–75 | 65–75 | 50–55 | 55–75 | 70–75 | 60–80 | 50–70 | 50–65 | 60–70 |
| KH | 185 | 188 | 80 | 184 | 184 | 182 | 184 | 185 | 183 | 185 | 186 | 184 |
| BH | 105 | 100 | 100 | 100 | 100 | 111 | 100 | 100 | 100 | 100 | 100 | 100 |
| CH | 0 | 0 | 0 | 0 | 0 | 0 | 0 | 0 | 0 | 0 | 0 | 0 |
| GG 60° < | 88–89 | 90–91 | 89 | 88–89 | 89 | 90 | 89–90 | 91–92 | 89–90 | 88–89 | 90–91 | 89–90 |
| EI | >10 | >10 | >10 | >10 | 9.1–10 | >10 | >10 | >10 | >10 | >10 | >10 | 9.4–10 |
| Impr. rev. | >806.4 | >691.2 | 944.6 | >944.6 | 691.2 | >944.6 | >944.6 | >944.6 | >944.6 | >944.6 | >944.6 | 806.4 |
| Notes: | Curing conditions: 200° C./8 minutes or 180° C./15 minutes | | | | | | | | | | | |

What is claimed as new and desired to be secured by Letters Patent of the United States is:

1. A process for the preparation of polyaddition product comprising:
   reacting
   I. from 40 to 85% by weight of the uretdione of isophorone diisocyanate and
   II. from 60 to 15% by weight of one or more diols, and one or more chain extenders,
   wherein said reacting step is carried out (1) at temperatures of from 50 to 100° C. in a solvent which is removed after reaction has taken place, or (2) without solvent in an intensive kneading apparatus at temperatures of from 120 to 190° C., optionally with the use of from 0.01 to 1% by weight of catalyst, based on the starting materials.

2. The process of claim 1, wherein said reacting is (2) and said intensive kneading apparatus is a twin-screw extruder.

3. The process according to claim 1, wherein said one or more diols are selected from the group consisting of ethylene glycol, butane-1,4-diol, pentane-1,5-diol, hexane-1,6-diol, 3-methylpentane- 1,5-diol, 2,2,4(2,4,4)-trimethyihexanediol (isomer mixture) and neopentylglycol hydroxypivalate.

4. The process according to claim 1, wherein said one or more chain extenders are selected from the group consisting of linear polyesters containing hydroxyl groups having a molecular mass of from 300 to 1,500.

5. The process according to claim 1, wherein said one or more chain extenders are selected from the group consisting of linear polyesters containing hydroxyl groups comprising at least one diol monomer selected from the group consisting of ethylene glycol, butane-1,4-diol, pentane-1,5-diol, hexane-1,6-diol, 3-methylpenlane 1,5-diol, 2,2,4(2,4,4)-trimethylhexanediol and neopentylglycol hydroxypivalate, 2-methylpropanediol, 2,2-dimethylpropanediol, di-ethylene glycol, dodecane-1,12-diol, trans- and cis-cyclohexanedimethanol and at least one monomer selected from the group consisting of succinic, adipic, suberic, azelaic, sebacic, and 2,2,4(2,4,4)-trimethyladipic acids (isomer mixture), -caprolactone and hydroxycaproic acid.

6. The process according to claim 1, wherein both diols and chain extenders are used in a diol/chain extender molar ratio of from 5:95 to 90:10.

7. The process according to claim 1, wherein said reacting (1) is carried out.

8. The process according to claim 1, wherein said reacting (2) is carried out.

9. The process according to claim 1, wherein said reacting is in the presence of a catalyst in a concentration of from 0.01 to 1% by weight, based on the starting materials.

10. The process according to claim 9, wherein said catalyst is an organotin catalyst.

11. The process according to claim 10, wherein said organotin catalyst is dibutyltin dilaurate.

12. The process according to claim 9, wherein said catalyst is used in a concentration of from 0.03 to 0.5% by weight, based on the starting materials.

13. The process according to claim 1, wherein said uretdione of isophorone diisocyanate is isocyanurate-free.

14. The process according to claim 1, wherein said one or more diols is neopentyiglycol hydroxypivalate.

15. A polyurethane powder coating comprising one or more polyaddition products containing hydroxyl and uretdione groups obtained by reacting
   I. from 40 to 85% by weight of an uretdione of isophorone diisocyanate and
   II. from 60 to 15% by weight of one or more diols, and one or more chain extenders,
   wherein the polyaddition product has one or more terminal hydroxyl groups, a functionality of 2 and a molecular mass of from 4,500 to 10,000 and one or more polymers containing hydroxyl groups.

16. The powder coating according to claim 15, wherein said molecular mass is from 4,500 to 7,000.

17. The powder coating according to claim 15, wherein said one or more diols are selected from the group consisting of ethylene glycol, butane-1,4-diol, pentane-1,5-diol, hexane-1,6-diol, 3-methylpentane-1,5-diol, 2,2,4(2,4,4)-trimethylhexanediol (isomer mixture) and neopentyiglycol hydroxypivalate.

18. The powder coating according to claim 15, wherein said one or more chain extenders are selected from the group consisting of linear polyesters containing hydroxyl groups having a molecular mass of from 250 to 2,000.

19. The powder coating according to claim 18, wherein said linear polyesters containing hydroxyl groups have a molecular mass of from 300 to 1,500.

20. The powder coating according to claim 18, wherein said linear polyesters containing hydroxyl groups comprise at least one diol monomer selected from the group consisting of ethylene glycol, butane-1,4-diol, pentane-1,5-diol, hexane-1,6-diol, 3-methylpentane1,5-diol, 2,2,4(2,4,4)-trimethylhexanediol and neopentylglycol hydroxypivalate, 2-methylpropanediol, 2,2-dimethylpropanediol, di-ethylene glycol, dodecane-1,12-diol, trans- and cis-cyclohexanedimethanol and at least one monomer selected from the group consisting of succinic, adipic, suberic, azelaic, sebacic, and 2,2,4(2,4,4)-trimethyladipic acids (isomer mixture), -caprolactone and hydroxycaproic acid.

21. The powder coating according to claim 15, wherein both diols and chain extenders are in a diol/chain extender molar ratio of from 5:95 to 90:10.

22. The powder coating according to claim 15, wherein said reacting is carried cut in solvent, which is removed after reaction has taken place.

23. The powder coating according to claim 15, wherein said reacting step is carried out without solvent in an intensive kneading apparatus.

24. The powder coating according to claim 23, wherein said intensive kneading apparatus is a twin-screw extruder.

25. The powder coating according to claim 15, wherein said reacting is in the presence of a catalyst in a concentration of from 0.01 to 1% by weight, based on the starting materials.

26. The powder coating according to claim 25, wherein said catalyst is an organotin catalyst.

27. The powder coating according to claim 26, wherein said organotin catalyst is dibutyltin dilaurate.

28. The powder coating according to claim 15, wherein said uretdione of isophorone diisocyanate is isocyanurate-free.

29. The powder coating according to claim 15, wherein said one or more diols is neopentylglycol hydroxypivalate.

30. A polyurethane coating powder comprising one or more polyaddition products containing hydroxyl and uretdione groups obtained by reacting
   I. from 40 to 85% by weight of an uretdione of isophorone diisocyanate and
   II. from 60 to 15% by weight of one or more diols,
   wherein the polyaddition product has one or more terminal hydroxyl groups, a functionality of 2 and a molecular mass of from 5,500 to 10,000 and one or more polymers containing hydroxyl groups.

31. The powder coating according to claim 30, wherein said coating has an OH group/NCO group ratio of from 1:0.5 to 1:2.

32. The powder coating according to claim 30, wherein said OH group/NCO group ratio is from 1:0.8 to 1:1.

33. The powder coating according to claim 30, wherein said OH group/NCO group ratio is 1:1.

34. The powder coating according to claim 30, further comprising one or more catalysts at a total catalyst concentration of from 0.03 to 0.5% by weight.

35. The powder coating according to claim 34, wherein said total catalyst concentration is from 0.05 to 0.15% by weight.

36. The powder coating according to claim 30, wherein said one or more polymers containing hydroxyl groups are polyesters having a functionality>2, an OH number of from 20 to 200 mg of KOH/g, a viscosity<60 000 mPa·s at 160° C., and a melting point$\geq$70° C. and $\leq$120° C.

37. The powder coating according to claim 30, wherein said molecular mass is from 5,500 to 7,000.

38. The powder coating according to claim 30, wherein said one or more diols are selected from the group consisting of ethylene glycol, butane-1,4-diol, pentane-1,5-diol, hexane-1,6-diol, 3-methylpentane-1,5-diol, 2,2,4(2,4,4)-trimethylhexanediol (isomer mixture) and neopentylglycol hydroxypivalate.

39. The powder coating according to claim 30, wherein said reacting is carried out in solvent, which is removed after reaction has taken place.

40. The powder coating according to claim 30, wherein said reacting is carried cut without solvent in an intensive kneading apparatus.

41. The powder coating according to claim 40, wherein said intensive kneading apparatus is a twin-screw extruder.

42. The powder coating according to claim 30, wherein said reacting is in the presence of a catalyst in a concentration of from 0.01 to 1% by weight, based on the starting materials.

43. The powder coating according to claim 42, wherein said catalyst is an organotin catalyst.

44. The powder coating according to claim 43, wherein said organotin catalyst is dibutyltin dilaurate.

45. The powder coating of claim 30, wherein said uretdione of isophorone diisocyanate is isocyanurate-free.

46. The powder coating of claim 30, wherein said one or more diols is neopentylglycol hydroxypivalate.

47. A substrate comprising a powder coating according to claim 15.

48. A substrate comprising a powder coating according to claim 30.

49. The process according to claim 1, wherein said one or more chain extenders are selected from the group consisting of linear polyesters containing hydroxyl groups having a molecular mass of from 250 to 2,000.

50. The powder coating according to claim 15, wherein said coating has an OH group/NCO group ratio of from 1:0.5 to 1:2.

51. The powder coating according to claim 15, wherein said OH group/NCO group ratio is from 1:0.8 to 1:1.

52. The powder coating according to claim 15, wherein said OH/NCO ratio is 1:1.

53. The powder coating according to claim 15, further comprising one or more catalysts at a total catalyst concentration of from 0.03 to 0.5% by weight.

54. The powder coating according to claim 53, wherein said total catalyst concentration is from 0.05 to 0.15% by weight.

55. The powder coating according to claim 15, wherein said one or more polymers containing hydroxyl groups are polyesters having a functionality>2, an OH number of from 20 to 200 mg of KOH/g, a viscosity<60 000 mPa·s at 160° C., and a melting point$\geq$70° C. and $\leq$120° C.

* * * * *